United States Patent [19]

Iwai et al.

[11] Patent Number: 5,624,134
[45] Date of Patent: Apr. 29, 1997

[54] GAS GENERATOR FORMED WITH ELECTRON BEAM WELDING

[75] Inventors: Yasunori Iwai, Osaka; Akihisa Ogawa, Hyogo; Hiroaki Shinto; Masaru Masaki, both of Aichi, all of Japan

[73] Assignee: Daicel Chemical Industries, Inc., Japan

[21] Appl. No.: 490,123

[22] Filed: Jun. 14, 1995

Related U.S. Application Data

[62] Division of Ser. No. 348,760, Dec. 2, 1994, Pat. No. 5,527,067, which is a continuation of Ser. No. 35,439, Mar. 24, 1993, abandoned.

[30] Foreign Application Priority Data

Apr. 15, 1992 [JP] Japan .................................. 4-095229

[51] Int. Cl.⁶ .................................................. B60R 21/26
[52] U.S. Cl. ........................ 280/741; 102/531; 280/736
[58] Field of Search .................................. 280/741, 742, 280/740, 736, 737; 102/272, 273, 530, 531; 422/164

[56] References Cited

U.S. PATENT DOCUMENTS

| | | |
|---|---|---|
| 3,532,360 | 10/1970 | Leising et al. . |
| 3,618,980 | 11/1971 | Leising et al. . |
| 3,632,133 | 1/1972 | Hass . |
| 3,985,076 | 10/1976 | Schneiter . |
| 4,131,299 | 12/1978 | Ono et al. . |
| 4,278,638 | 7/1981 | Nilsson et al. . |
| 4,296,084 | 10/1981 | Adams et al. . |
| 4,530,516 | 7/1985 | Adams et al. . |
| 4,547,342 | 10/1985 | Adams et al. . |
| 4,578,247 | 3/1986 | Bolleau . |
| 4,590,041 | 5/1986 | Hill . |
| 4,943,086 | 7/1990 | Cunningham . |
| 5,000,479 | 3/1991 | Werner et al. . |
| 5,104,466 | 4/1992 | Allard et al. . |

FOREIGN PATENT DOCUMENTS

| | | |
|---|---|---|
| 4730045 | 4/1972 | Japan . |
| 5016057 | 7/1975 | Japan . |
| 301144 | 10/1988 | Japan . |
| 3-92448 | 4/1991 | Japan . |

*Primary Examiner*—Eric D. Culbreth

[57] ABSTRACT

The present invention is a small, light-weight gas generator for a passenger air bag. The gas generator includes a housing having a diffuser shell and a closure shell. The diffuser shell includes a round portion, a center cylindrical portion extending concentrically from inside a peripheral portion of the round portion, and an inner cylindrical portion. The center cylindrical portion is disposed at the center of the round portion for storing therein a squib-enhancer. The inner cylindrical portion is disposed outside the center cylindrical portion to provide a combustion chamber. The closure shell includes an annular portion equipped with a center hole for receiving the center cylindrical portion, and a peripheral wall portion extending from the peripheral portion of the annular portion to the peripheral portion of the round portion of the diffuser shell. This peripheral wall portion defines a coolant-filter chamber and includes a gas discharge port and a flange portion extending in a radial direction. Welding bonds the closure and diffuser shells together at the outer peripheral portion of the center cylindrical portion and the peripheral portion of the center hole; at the tip of the inner cylindrical portion and the region of the annular portion coming into contact with the tip; and at the peripheral portion of the round portion and the tip portion of the peripheral wall portion.

18 Claims, 2 Drawing Sheets

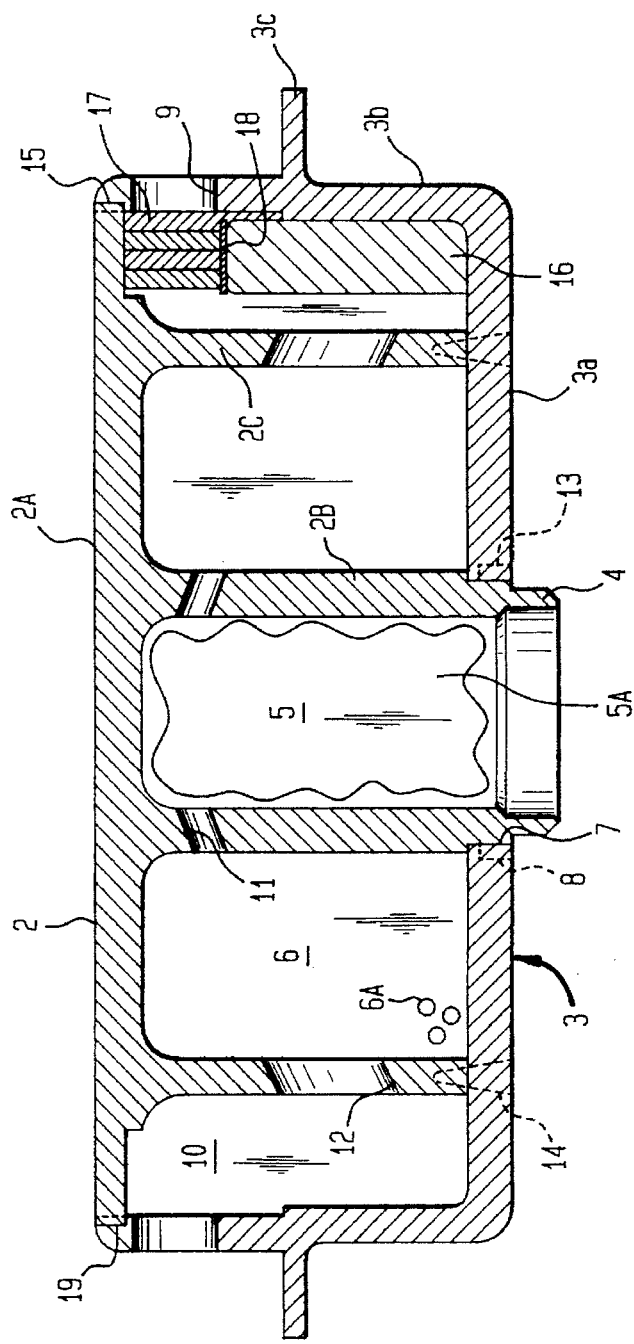
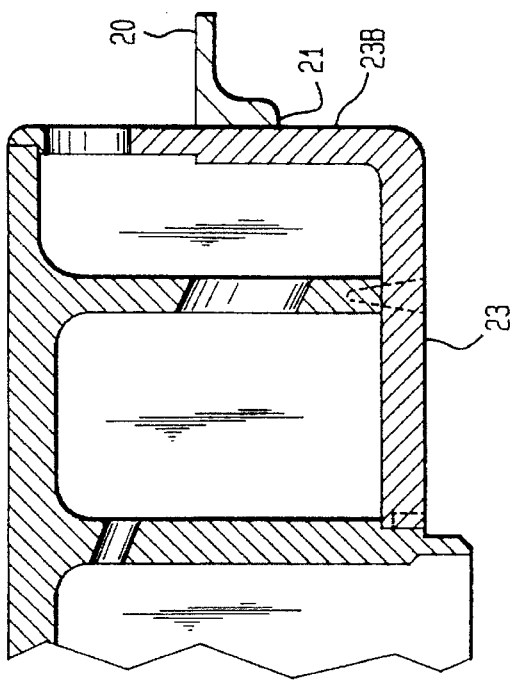

GAS GENERATOR FORMED WITH ELECTRON BEAM WELDING

This is a divisional of application Ser. No. 08/348,760 filed on Dec. 2, 1994, now U.S. Pat. No. 5,527,067, which is a continuation of Ser. No. 08/035,439 filed on Mar. 24, 1993 and now abandoned.

BACKGROUND OF THE INVENTION

1. Field of the Invention

This invention relates to a gas generator for an air bag for protecting a passenger from impact, and more particularly, to a novel housing structure for a gas generator.

2. Prior Art

A conventional housing structure for a gas generator for air bags is disclosed in U.S. Pat. No. 4,547,342. This structure includes a housing comprising a diffuser shell and a closures shell. The diffuser shell is molded by forging, and has three concentric cylinders: an ignition chamber, a combustion chamber formed outside the ignition chamber and a coolant/filter chamber formed outside the combustion chamber. An opening for mutually communicating the combustion and coolant/filter chambers is bored in the cylinder and a gas discharge port is bored in the outer cylinder. The diffuser shell and the closure shell are bonded to each other by three concentric weld portions formed by friction welding. Ignition means, i.e. an igniter, is fitted into the inner cylinder of the closure shell and welding takes place while the igniter 53 is in the hole.

Various other prior art references, similarly, include means for fastening the diffuser shell to the closure shell in ways that add to the size and weight of the gas generator. Such references are as follows:

U.S. Pat. No. 3,532,360 to Leising, et al. discloses a gas generating apparatus having a housing, a gas generating section, a coolant chamber, and inflatable air bag. The housing is generally bowl shaped and includes a bottom wall and a side wall. The gas generator is separated from an air bag by a plate having holes extending therethrough and a diaphragm which ruptures under pressure when the gas generant begins burning. The burning mixture is propelled into the air bag and continues to burn to achieve full inflation of the bag.

U.S. Pat. No. 3,618,980 to Leising, et al. discloses a gas generator having an ignitable propellant and a bag adapted to be inflated by gas released from the propellant. Also included is a trapping device for inhibiting movement of burning propellant from the gas generator to the interior of the bag. The trapping device includes a deflector which directs the propellant toward veins. The veins direct the materials towards the walls of the chamber in which they are positioned, causing the materials to travel in a generally circular pass, thereby enhancing combustion of the propellant. Because of their mass and velocity, reacting particles are kept in the chamber until fully consumed. A gas generator is contained in two housings that are connected together by plurality of fasteners.

U.S. Pat. No. 3,632,133 to Hass, discloses an inflatable air bag that includes a gas generator which, upon ignition, produces a high velocity gas stream directed into the converging end of a converging-diverging nozzle and then into the inflatable air bag. The high velocity stream of gas also influences the drawing of gas from the exterior of the gas generator into the air bag.

U.S. Pat. No. 3,985,076 to Schneiter et al. discloses a gas generator having an inner housing and an outer housing forming an annular chamber, having a central ignition means surrounded by a gas generant composition. The inner housing has a plurality of peripheral orifices. The inner housing is threadably engaged with the outer housing. The gas generant is surrounded by a diaphragm which is ruptured upon ignition. The resulting gases are then passed through a filter for solid particles, then through a pH neutralizing material and cooling device before being expelled into an inflatable structure.

U.S. Pat. No. 4,296,084 to Adams et al. discloses a method and apparatus for gas generation comprising a housing comprising an upper convex half shell threadably attached to a lower concave half shell. Within the housing is a combustion chamber having a gas generant, an igniter, a primary filter means in the combustion chamber comprised of a woven fabric which swells and becomes tacky at the temperature of the combustion process to retard the outflow from the combustion chamber of combustible products, and a secondary filter located outside of the combustion chamber.

U.S. Pat. No. 4,278,638 to Nilsson, et al. discloses a gas generator construction having a housing with a central tubular housing part which contains an ignition device, surrounded by a reaction chamber containing a gas generant, surrounded by a filter. The device includes a S-shaped wall member forming part of the reaction chamber, having an aperture through which gases flow to the expansion chamber.

U. S. Pat. No. 4,530,516 to Adams, et al. discloses a gas generator for use with an inflatable air bag comprising an upper shell and a lower shell welded together and an elongated steel center-tie member rigidly attached through the center of the housing having a hollow cylindrical perforated body containing an igniter charge assembly. Surrounding the center-tie member is an annular chamber containing a gas generant. After combustion of the gas generant, gases flow circumferentially through a screen filter and through a diffuser screen assembly, through exit ports of the housing into the air bag.

U.S. Pat. No. 4,547,342 to Adams, et al. discloses a gas generator for use with an inflatable air bag comprising a housing having an upper shell and a lower shell welded together. Within the housing are three integrally formed concentric cylinders defining chambers. A gas generant is contained in the combustion chamber. Upon ignition of the gas generant, gases flow through an inner screen filter pack radially outward through a combustion chamber exit where they are turned downward by a deflector ring where they strike flashing and then flow radially outward between the deflector ring and an outer screen pack, through the outer screen pack and finally exit port holes in the housing.

U.S. Pat. No. 4,578,247 to Bolleau, discloses a gas generator comprising a housing having two subassemblies each having first and second concentric cylinders joined together by welding to form an igniter chamber and an outer chamber. The outer chamber is divided into three axial chambers, the first of which contains a fuel and the second and third chambers cooling and filtering means.

U.S. Pat. No. 4,590,041 to Hill, discloses a gas generator wherein gas generant pellets are maintained under pressure to improve the duration stability and decrease the degradation of the gas generant pellets. Pressure is applied by a plate that is spring biased against the pellets.

U.S. Pat. No. 4,943,086 to Cunningham, discloses a gas generator having a housing comprising an inner shell welded to an outer shell. Within the housing defined by the shells is an inner combustion chamber in the outer diffuser chamber. The igniter material is contained within a container that is free of attachment to any structural component of the housing, thereby permitting a greater number of apertures to be provided therein or a more diffused pattern of gas flow into the combustion chamber. This eliminates the need for an ignition cup for the igniter powder as the squib may fire directly into the igniter powder and insure greater ignition thereof.

Japanese Patent No. JP 63-301144 to Mizoguchi, discloses a structure of an air bag comprising a lattice configuration or a multiple pillar-shaped configuration so that less air is required for inflation of the air bag.

Japanese Patent No. JP 47-30045 to Kogyo, discloses a rapidly inflatable apparatus for shock absorption comprised of a series of tube-like inflators linked together by a piece of material which accepts an accelerated body after a collision.

Japanese Patent No. JP 50-16057 to Toyota Motor Corporation, discloses an air bag having inner and outer films joined by blocked connecting portions which take on a lattice or wave-like shape to maintain the shape of the bag.

The conventional housing structures described in the prior art involve the following problems:

1. Since bonding is effected by friction welding, fins develop. Accordingly, and an excessive space is necessary to accommodate the fins. Particularly, the outside fins must be removed from the aspect of appearance, etc. When the fins are not removed, the peripheral wall portion of the closure shell is formed overlappingly with the peripheral wall portion of the diffuser shell in such a manner as to cover the fins. In this case, an excessive material is necessary in the amount corresponding to the overlapping portion, and the weight increases as much.

2. To accomplish sufficient friction welding, the weld portion of the closure shell must be shaped as concentric protuberances. A part of these protuberances remain even after friction welding, and a space thereby defined. Accordingly, unnecessary increases in weight and volume occur.

3. Since welding is carried out while ignition means containing an ignition powder is fitted, there is the problem of safety during production. Furthermore, explosion-proof installation must be provided as a safety measure.

4. Since two openings are disposed on the same axis from the aspect of boring, the arrangement structure of the coolant and the filter is limited.

5. Visual inspection of the weld portions is difficult. In other words, it is not easy to find weld defects because the weld portions cannot be inspected from outside the housing.

6. Boring to form a hole in the closure shell is necessary to fit the ignition means.

7. Both the diffuser and closure shells are shaped by forging. However, since they have three concentric cylinders, the surface of the round portion does not become flat, and cutting is necessary.

Accordingly, the present invention aims at providing a novel gas generator for an air bag which solves the problems associated with the prior art.

OBJECTS AND SUMMARY OF THE INVENTION

The gas generator of the present invention is for use with an air bag for protecting a passenger from impact by introducing a gas generated by combustion means into an air bag. The gas generator includes a housing comprising a diffuser shell and a closure shell, a gas discharge port, combustion means stored in the housing, ignition means for igniting the combustion means, and coolant/filter means.

The gas generator of the present invention includes a diffuser shell that comprises a round portion, a center cylindrical portion extending concentrically from inside the peripheral portion of the round portion and an inner cylindrical portion. The center cylindrical portion is disposed at the center of the round portion, for storing therein the ignition means and is equipped at the tip thereof with caulking means for fixing the ignition means thereto. The inner cylindrical portion is disposed outside the center cylindrical portion and stores therein the combustion means.

The closure shell comprises an annular portion equipped with a center hole for receiving the center cylindrical portion, and a peripheral wall portion extending from the peripheral portion of the annular portion to the peripheral portion of the round portion. The peripheral portion defines a chamber for storing the coolant/filter means and includes the gas discharge portion and a flange portion extending in a radial direction.

Welding, preferably electron beam welding, bonds the outer peripheral portion of the center cylindrical portion and the peripheral portion of the center hole; the tip of the inner cylindrical portion and the region of the annular portion coming into contact with the tip of the inner cylindrical portion; and the peripheral portion of the round portion and the tip portion of the peripheral wall portion. The flange portion can be constituted as a separate member and can be bonded to the peripheral wall portion of the closure shell.

Accordingly, it is an object of this invention to overcome the problems associated with the prior art.

It is another object of this invention to provide a compact, lightweight gas generator for an air bag.

It is another object of this invention to provide a gas generator for an air bag that makes effective use of space.

It is still another object of this invention to provide a gas generator for an air bag that does not develop fins.

It is yet another object of this invention to provide a gas generator for an air bag that may be bonded together in a single welding operation, and which does not require subsequent machining.

It is yet another object of this invention to provide a gas generator for an air bag wherein the ignition means can be inserted into the housing after welding the housing together to insure safety.

It is yet another object of this invention to provide a gas generator for an air bag wherein visual inspection of the weld portions are possible.

BRIEF DESCRIPTION OF THE DRAWINGS

These and further objects of the present invention will become apparent to those skilled in the art from review of the following Detailed Description of the Invention and accompanying drawings in which:

FIG. 1 is a cross-sectional view of a housing of a gas generator according to the present invention.

FIG. 2 is a semi-sectional view showing another embodiment of a housing of a gas generator according to the present invention.

DETAILED DESCRIPTION OF THE INVENTION

Figure 3:
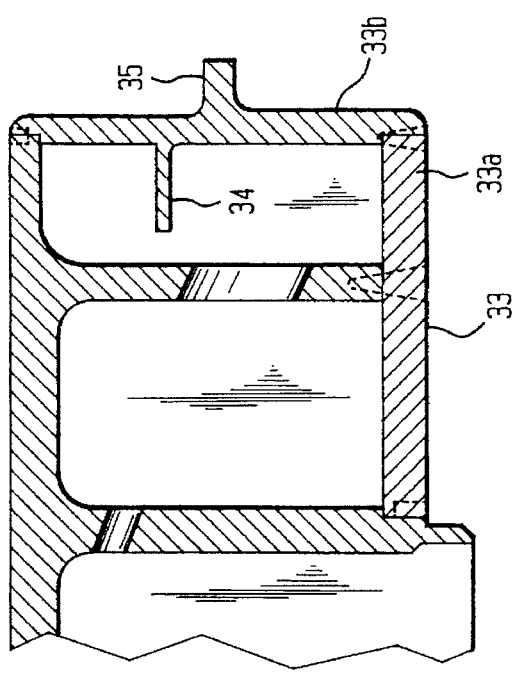
FIG. 3 is a semi-sectional view showing still another embodiment of a housing of a gas generator according to the present invention.
Figure 4:
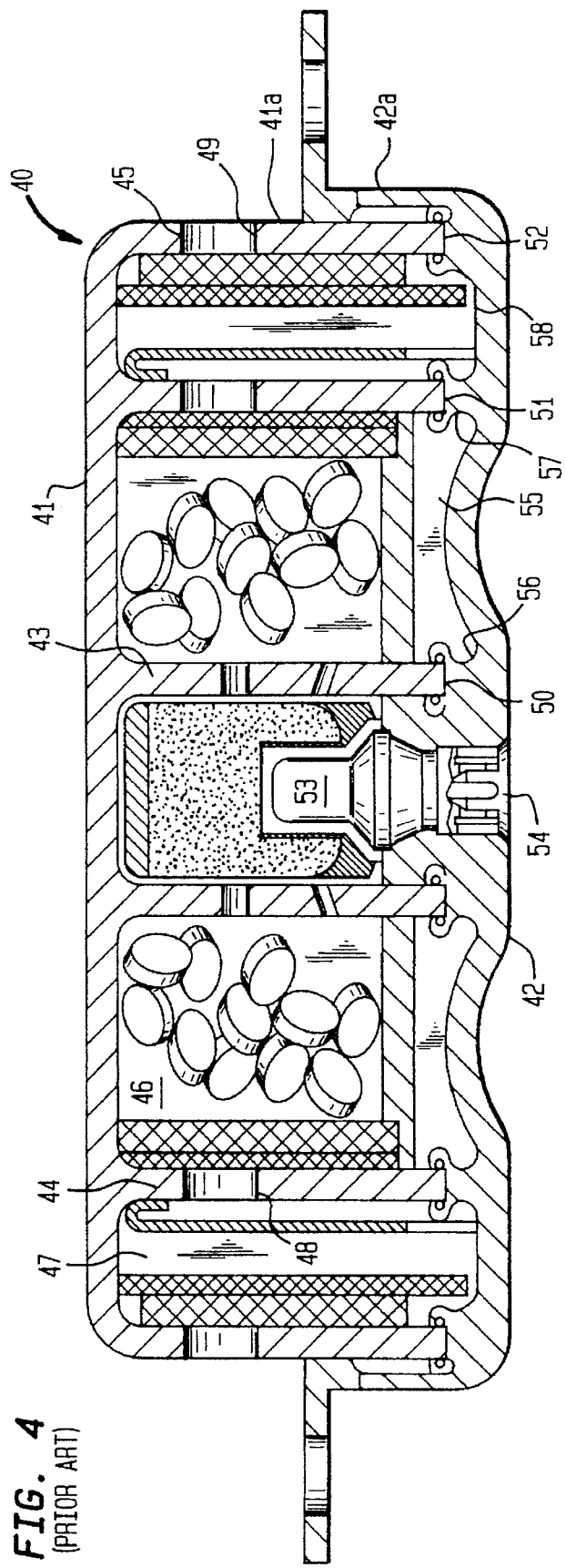
FIG. 4 is a sectional view of a conventional gas generator.

The gas generator of the present invention is shown in FIG. 1 in a sectional view. The housing 1 comprises a diffuser shell 2 and a closure shell 3. The diffuser shell 2 includes a round portion 2a, a concentric center cylindrical portion 2b extending from inside the peripheral portion 19 of the round portion 2a, and an inner cylindrical portion 2c formed between the center cylindrical portion 2b and the peripheral portion 19 of the round portion 2a.

The center cylindrical portion 2b is disposed at the center of the round portion 2a, i.e., at the center of the housing 1. When the diffuser shell 2 and the closure shell 3 are placed together, the tip of the center cylindrical portion 2b extends through a center hole 7 in the closure shell 3 to define a chamber in a peripheral direction, that is, a squib-enhancer chamber 5. Means for sealing the chamber 5 is provided, typically by means of a caulking portion 4 formed at the tip of the center cylindrical portion 2b. Since this caulking portion 4 protrudes outside the closure shell 3, caulking can be made from outside the housing 1.

Ignition means, 5A i.e., a squib-enhancer is disposed inside the squib-enhancer chamber 5. The squib-enhancer is disposed after the diffuser shell 2 and the closure shell 3 are bonded to each other by welding, and is fixed in place by means of the caulking portion 4.

The inner cylindrical portion 2c is formed concentrically about the center cylindrical portion 2b. This inner cylindrical portion 2c, encompasses the center cylindrical portion 2b, and when the diffuser and closure shells are placed together, its tip extends to the inner surface of the closure shell 3. This inner cylindrical portion 2c defines a combustion chamber 6 outside the squib-enhancer chamber 5. A gas generation agent 6A, is packed into this combustion chamber 6.

The closure shell 3 includes an annular portion 3a, a peripheral wall portion 3b and a flange portion 3c. The annular portion 3a is equipped with a center hole 7. A step portion 8 is formed at the tip of the center cylindrical portion 2b of the diffuser shell 2 that corresponds to the center hole 7. The step portion 8 extends around the outer periphery of the tip of the center cylindrical portion 2b. The center hole 7 has a diameter somewhat greater than the outer diameter of this step portion 8. The step portion 8 fits into this center hole 7 and the peripheral portion of the center hole 7 is anchored to the step portion 8.

The peripheral wall portion 3b of the closure shell 3 extends from the peripheral portion of the annular portion 3a to the peripheral wall portion of the round portion 2a of the diffuser shell 2. A fitting flange portion 3c is integrally formed with the peripheral wall portion 3b. The flange portion 3c extends from the peripheral wall portion 3b in a radial direction.

The peripheral wall portion 3b constitutes the outer peripheral wall of the housing 1, and encompasses the inner cylindrical portion 2c and defines a coolant-filter chamber 10 therebetween, the chamber 10 extending about the combustion chamber 6. The coolant-filter chamber 10 is divided into an upper stage and a lower stage by a retainer 18. A filter 17 is disposed on the upper stage and a coolant 16 is disposed on the lower stage (only one side being shown in the sectional view). A plurality of gas discharge ports 9 are bored with a predetermined gap between them in the peripheral direction at the position opposite to the opening 12, that is, at the tip of the peripheral wall portion 3b.

A through-hole 11 is bored obliquely in the base portion of the center cylindrical portion 2b so that the injection of a flame from the squib-enhancer chamber 5 into the combustion chamber 6 is made in a downward direction. This through-hole 11 communicates the squib-enhancer chamber 5 with the combustion chamber 6. A plurality of openings 12 in the inner cylindrical portion 2c have the same inclination as that of the through-hole 11 and have a greater open area than that of the through-hole 11. The openings 12 are bored in the tip of the inner cylindrical portion 2c with a predetermined gap between them in the peripheral direction.

The diffuser shell 2 and the closure shell 3 are bonded to each other preferably by electron beam welding. Three weld portions are formed concentrically with one another. The weld portion 13 is formed at the step portion 8 of the center cylindrical portion and the peripheral edge portion of the center hole 7. The weld portion 14 is formed at the tip of the inner cylindrical portion 2c and the region of the annular portion 3a coming into contact with the tip. The weld portion 15 is formed at the peripheral portion of the round portion 2a and at the tip of the peripheral wall portion 3b.

In operation, when the sensor detects an impact, a sensor signal is sent to the squib and the squib operates, so that the enhancer is ignited, generating a high temperature flame. This flame passes through the through-hole 11 and ignites the gas generation agent inside the combustion chamber 6. Accordingly, the gas generation agent burns and generates a gas. The combustion gas is jetted from the opening 12 into the coolant-filter chamber 10 and passes through the coolant 16 and the filter 17. The cooled combustion residue is removed, and the cooled and purified gas flows into the air bag (not shown) through the gas discharge port 9. Accordingly, the air bag inflates and protects a passenger from the impact.

FIG. 2 shows another embodiment of the present invention. In this embodiment, the flange portion 20 is constituted as a separate member and is bonded to the peripheral wall portion 23b of the closure shell 3 by welding 21. Accordingly, the closure shell 23 can be shaped by press machining. As a result, the production cost can be reduced in comparison with article obtained by the conventional forging method. The flange portion 20, too, can be molded efficiently and economically by press machining.

FIG. 3 shows still another embodiment of the present invention. In this case, the closure shell 33 is divided into two parts. In other words, the annular portion 33a of the closure shell 33 and its peripheral wall portion 33b are constituted as separate members. The retainer 34 and the flange 35 are integrally formed with this peripheral wall portion 33b. Accordingly, the annular portion 33a of the closure shell 33 can be molded economically by press machining. Since the retainer 34 is molded integrally, the number of components can be reduced.

Preferably, the annular portion of the closure shell and its peripheral wall portion are constituted as separate members, and a retainer and a flange are integrally formed on the peripheral wall portion.

Electron beam welding may be carried out at the bond portion between both of the shells. Electron beam welding is a welding method which irradiates an electron beam of a high velocity to a member to be welded in high vacuum and effects welding by utilizing impact heating. According to this method, a penetration depth of a weld bead is extremely great and for this reason, single-layer welding from one side becomes possible. Heat concentrates and the degree of thermal effects is extremely low. Therefore, deformation and residual stress are small and a weld structure having a high dimensional accuracy can be obtained. Besides electron beam welding, ultrasonic welding, laser welding, etc., can also be used.

Preferably the housing member is made of an aluminum alloy, but stainless steel, carbon steel, etc., can also be utilized. The present invention provides the following benefits:

Since bonding is made by electron beam welding, no fins occur. Accordingly, an excessive space for escaping fins is not necessary, and effective utilization of the space can be made. Fin becomes unnecessary and the trouble for the removal can be eliminated. The peripheral wall portion of the base and the peripheral wall portion of the diffuser need not overlap with each other so as to cover the fins as has been necessary in the prior art. Accordingly, such overlapping material is unnecessary so that the weight of the gas generator can be reduced, as well. Accordingly, the present invention can accomplish a compact and light-weight gas generator.

Since electron beam welding is carried out, the weld portion of the closure shell need not have the protrusions as has been necessary in the case of friction welding. Accordingly, residual protuberances after friction welding do not exist and a space resulting from these residual protuberances is not necessary, so that the weight and size of the housing can be reduced.

The ignition means can be fitted after welding and safety can be secured. Therefore, explosion-proofing installation is not necessary.

The inner cylindrical portion is formed on the diffuser shell side while the outer peripheral wall of the housing is formed on the closure shell side. Therefore, two openings 12 and 9 can be disposed on mutually different axes. As a result, disposition of the coolant and the filter can be set freely, and selection of optimum performance can be made.

Visual inspection of the weld portion becomes possible and any weld defects can be easily found out.

Boring for fitting the ignition means is not necessary and the ignition means can be fixed easily by the caulking portion of the center cylindrical portion.

Having thus described the invention in detail, it is understood that the foregoing description is not intended to limit the spirit and scope thereof. What is desired to be protected by Letters Patent is set forth in the appended claims.

What is claimed is:

1. A gas generator for an air bag comprising:
    a housing comprising:
        a diffuser shell comprising:
            a first annular portion having a first peripheral edge,
            a center cylindrical wall extending from the first annular portion to define a center chamber, the center cylindrical wall comprising:
                an end portion,
                a caulking portion constructed and arranged at the end portion for sealing the center chamber,
            a step portion formed on the center cylindrical wall,
            an intermediate cylindrical wall extending from the first annular portion to define an intermediate closed chamber arranged concentrically about the center cylindrical wall;
        a closure shell comprising:
            a second annular portion extending to a sidewall terminating in a second peripheral edge,
            an aperture extending through the second annular portion for receiving the step portion of the center cylindrical wall,
            at least one gas discharge port extending through the sidewall,
            a first weld to join the diffuser shell with the closure shell, the first weld formed to extend from an exterior surface of the second annular portion of the closure shell to the center cylindrical wall of the diffuser shell along a first line where the second annular portion and the center cylindrical wall are in perpendicular abutment at a junction of the step portion and the second annular portion adjacent to the aperture,
        a second weld formed to extend from the exterior surface of the second annular portion of the closure shell to the intermediate cylindrical wall of the diffuser shell,
        a third weld formed to extend from an exterior surface Of the first peripheral edge of the first annular portion of the diffuser shell to the second peripheral edge of the sidewall; and
    a coolant and filter chamber disposed between the sidewall and the intermediate cylindrical wall, the coolant and filter chamber comprising:
        a retainer disposed within the coolant and filter chamber to separate the chamber into a first stage for a filter and a second stage for a coolant.

2. A gas generator for an air bag, comprising:
    a housing comprising:
        a diffuser shell comprising:
            a first annular portion having a first peripheral edge,
            a center cylindrical wall extending from the first annular portion to define a center chamber,
            a step portion formed on the center cylindrical wall,
            an intermediate cylindrical wall extending from the first annular portion to define an intermediate closed chamber arranged concentrically about the center cylindrical wall; and
        a closure shell comprising:
            a second annular portion extending to a sidewall terminating in a second peripheral edge,
            an aperture extending through the second annular portion for receiving the step portion of the center cylindrical wall,
            at least one gas discharge port extending through the sidewall,
            a first weld to join the diffuser shell with the closure shell, the first weld formed to extend from an exterior surface of the second annular portion of the closure shell to the center cylindrical wall of the diffuser shell along a first line where the second annular portion and the center cylindrical wall are in perpendicular abutment at a junction of the step portion and the second annular portion adjacent to the aperture.

3. The apparatus of claim 2, further comprising:
    a second weld formed to extend from an exterior surface of the second annular portion of the closure shell to the intermediate cylindrical wall of the diffuser shell.

4. The apparatus of claim 3, further comprising:
    a third weld formed to extend from an exterior surface of the first peripheral edge of the first annular portion of the diffuser shell to the second peripheral edge of the sidewall.

5. The apparatus of claim 4, wherein the first, second and third welds are electron beam welds.

6. The apparatus of claim 2, wherein the diffuser shell and closure shell are comprised of aluminum alloy.

7. The apparatus of claim 2, wherein the center cylindrical wall further comprises:
    an end portion,
    sealing means constructed and arranged at the end portion for sealing the center chamber.

8. The apparatus of claim 2, further comprising:
a coolant and filter chamber disposed between the side wall and the intermediate cylindrical wall, the coolant and filter chamber comprising:
a retainer disposed within the coolant and filter chamber to separate the chamber into a first stage for a filter and a second stage for a coolant.

9. The apparatus of claim 8, wherein the retainer is formed integral with the side wall.

10. A housing for a gas generator, comprising:
a diffuser shell, and
a closure shell
the diffuser shell comprising:
a flat diffuser plate,
inner and outer concentric cylindrical sections extending perpendicular from the flat diffuser plate;
the closure shell comprising:
a flat closure plate extending beyond the outer concentric cylindrical section of the flat diffuser plate and having a central aperture therethrough,
the flat closure plate abutting the inner and outer concentric cylindrical sections;
the flat closure plate in perpendicular abutment to the inner and outer concentric cylindrical sections
to coact with the inner and outer concentric cylindrical sections and the flat diffuser plate to form an annular closed chamber;
the flat closure plate joined to a perpendicular abutting surface of the inner and outer concentrics cylindrical sections along the surface of the perpendicular abutment; and
a weld extending from an exterior surface of the flat closure plate to the perpendicular abutting surface of each of the inner and outer concentric cylindrical sections at the surface of the perpendicular abutment.

11. The housing of claim 10, further comprising:
a third cylindrical section disposed concentrically about the outer cylindrical section and operatively associated with the flat closure plate of the closure shell;
the third cylindrical section in perpendicular abutment with the flat diffuser plate and welded thereto along a surface of perpendicular abutment with the flat diffuser plate.

12. The housing of claim 11, wherein the flat diffuser plate extends over the abutting surface of the third cylindrical section.

13. The housing of claim 11, further comprising passage means constructed and arranged in each of the inner and outer concentric cylindrical sections and the third cylindrical section through which gas can move.

14. The housing of claim 11, wherein the third cylindrical section is continuous from the flat closure plate.

15. The housing of claim 14, wherein the third cylindrical section abuts the end of the flat closure plate and is welded along the surface of a line of perpendicular abutment therebetween.

16. The housing of claim 15, wherein the surface of a line of perpendicular abutment of the third cylindrical section and the flat closure plate is at the periphery of the flat closure plate and the cylindrical surface of the third cylindrical section.

17. The housing of claim 15, wherein the abutting surface is at the flat surface of the flat diffuser plate and an end of the third cylindrical section.

18. The housing of claim 10, wherein a circumferential edge at the central aperture of the flat closure plate abuts the cylindrical surface of the inner cylindrical section.

* * * * *